(12) United States Patent
Pin, III et al.

(10) Patent No.: US 11,897,795 B2
(45) Date of Patent: Feb. 13, 2024

(54) LIQUID PROCESSING APPARATUS

(71) Applicant: Liberty Pumps, Inc., Bergen, NY (US)

(72) Inventors: Clement A. Pin, III, Rochester, NY (US); David M. Williams, Attica, NY (US); Randolph S Clark, Warsaw, NY (US)

(73) Assignee: Liberty Pumps, Inc., Bergen, NY (US)

( * ) Notice: Subject to any disclaimer, the term of this patent is extended or adjusted under 35 U.S.C. 154(b) by 0 days.

(21) Appl. No.: 16/951,369

(22) Filed: Nov. 18, 2020

(65) Prior Publication Data

US 2022/0153614 A1 May 19, 2022

(51) Int. Cl.
*C02F 1/66* (2023.01)
*C02F 103/34* (2006.01)

(52) U.S. Cl.
CPC ............ *C02F 1/66* (2013.01); *C02F 2103/34* (2013.01); *C02F 2201/006* (2013.01)

(58) Field of Classification Search
CPC ....................................................... C02F 1/66
See application file for complete search history.

(56) References Cited

U.S. PATENT DOCUMENTS 4,411,779 A * 10/1983 McConnell, III .... B01D 24/007
                                                        210/275
10,480,822 B2  11/2019 Deivasigamani et al.
2015/0274544 A1* 10/2015 Ben-David ............. C02F 1/003
                                                        210/232
2020/0031651 A1*  1/2020 Schneidewend ...... A47J 31/461

FOREIGN PATENT DOCUMENTS

AU         636360 B2 *  4/1993  .............. C02F 1/283

OTHER PUBLICATIONS

Wayback Machine Oct. 31, 2020 webpage https://www.saniflo.com/us/new-product-imported-from-sfa-france/237-sanicondens-best-flat.html.*
Saniflo Sanicondens best flat installation manual, Oct. 2019.*
(Continued)

*Primary Examiner* — Peter Keyworth
(74) *Attorney, Agent, or Firm* — John M. Hammond; Patent Innovations LLC

(57) ABSTRACT

A liquid processing apparatus comprised of a housing comprising a bottom wall, a side wall, and a central wall dividing a volume enclosed by the bottom wall and side wall into a treatment chamber and a discharge chamber; and a cartridge disposed in the treatment chamber. The cartridge may be comprised of a base wall and a lateral wall forming a media chamber, and a plurality of passageways through at least one of the base wall and side wall rendering the media chamber in communication with the treatment chamber. A treatment medium is contained in the media chamber. The cartridge may be comprised of a plurality of divider walls partitioning the media chamber into media compartments. The housing may be further comprised of a plurality of locating walls extending vertically upward from the bottom wall of the housing and between the divider walls of the cartridge.

15 Claims, 5 Drawing Sheets

(56) References Cited

OTHER PUBLICATIONS

Saniflo SFA Group SANICONDENS Best Flat product information web site at https://www.saniflo.com/us/new-product-imported-from-sfa-france/237-sanicondens-best-flat.html. Publication date unknown. EFS file name: 20210105_16-951369_IDS_NPL_Cite1.

Saniflo SFA Group SANICONDENS Best Flat product brochure downloaded from https://www.saniflo.com/us/new-product-imported-from-sfa-france/237-sanicondens-best-flat.html. Publication date unknown. EFS file name: 20210105_16-951369_IDS_NPL_Cite2.

Saniflo SFA Group SANICONDENS Best Flat product announcement web site at https://www.saniflo.com/us/blog/saniflo-expands-condensate-pump-offering-with-new-lower-profile-higher-capacit-n92. Publication date Mar. 4, 2020. EFS file name: 20210105_16-951369_IDS_NPL_Cite3.

Neutra-Safe neutralizing condensate pumps product information web site at https://neutrasafe.com/condensate-pump/. Publication date unknown. EFS file name: 20210105_16-951369_IDS_NPL_Cite4.

Axiom NT-1P NeutraPump neutralizing condensate pump product information web site at http://axiomind.sasktelwebhosting.com/nt1-p.php. Publication date unknown. EFS file name: 20210105_16-951369_IDS_NPL_Cite5.

Axiom NT-1P NeutraPump neutralizing condensate pump product brochure downloaded from http://axiomind.sasktelwebhosting.com/nt1-p.php. Copyright 2017. EFS file name: 20210105_16-951369_IDS_NPL_Cite6.

JJM Alkaline Technologies Model NBT-24P product information web site at https://jjmalkalinetech.com/products/model-hbt-24p/. Publication date unknown. EFS file name: 20210105_16-951369_IDS_NPL_Cite7.

JJM Alkaline Technologies Acidic Condensate Neutralizer Technical Information and Submittal downloaded from https://jmalkalinetech.com/products/model-nbt-24p/. Publication date unknown. EFS file name: 20210105_16-951369_IDS_NPL_Cite8.

JJM Alkaline Technologies NBT Series Installation, Operation, & Maintenance downloaded from https://jjmalkalinetech.com/products/model-nbt-24p/. Revised Jun. 2020. EFS file name: 20210105_16-951369_IDS_NPL_Cite9.

\* cited by examiner

LIQUID PROCESSING APPARATUS

TECHNICAL FIELD

Apparatus for neutralizing a stream of water discharged from a source.

BACKGROUND

Energy conversion devices, such as high efficiency boilers, may produce an aqueous condensate, which may be acidic. Above a certain level of acidic strength (i.e., below a threshold pH), the condensate may be too acidic to be discharged into downstream piping and other fluid handling equipment, and onward into waterways such as rivers and lakes. The acid species in the condensate may cause corrosion in the downstream piping and equipment, and may be deleterious to the environment.

In such cases, there is a need to neutralize the condensate before discharge into piping, equipment, and/or public waterways.

SUMMARY

A liquid processing apparatus of the present disclosure meets this need. The apparatus may be used to neutralize condensate discharged from an energy conversion device such as a boiler or a furnace. The apparatus contains a neutralization medium, through which the discharged condensate passes. The volume of neutralization medium has a limited capacity for neutralization. In other words, after a certain "neutralization load" has passed through the neutralization medium, the ability of the medium to neutralize the condensate (or liquid from another source) becomes exhausted. (The neutralization load increases linearly with volume of condensate, and increases by a factor of ten for each decrease of one unit of pH.) When the ability of the medium to neutralize the condensate becomes exhausted, the medium must be replaced. It is desirable that the replacement of the neutralization medium be easily done. It is also desirable that an apparatus for neutralizing a condensate or other aqueous solution is configured such that flow though the neutralizing medium contained therein is uniformly distributed. In that manner, all of the neutralizing capacity of the medium is used and all of the liquid flowing through the medium is completely neutralized. The liquid processing apparatus of the present disclosure also meets these needs.

The liquid processing apparatus may be comprised of a housing comprising a bottom wall, a side wall, and a central wall having a first end joined to the side wall and a second end joined to the side wall, and dividing a volume enclosed by the bottom wall and side wall into a treatment chamber and a discharge chamber; and a cartridge disposed in the treatment chamber. The cartridge may be comprised of a base wall and a lateral wall forming a media chamber, and a plurality of passageways through at least one of the base wall and side wall rendering the media chamber in communication with the treatment chamber.

The apparatus may be further comprised of a treatment medium contained in the media chamber. A top cover may be hingably attached to a portion of the lateral wall of the cartridge. The cartridge may be comprised of a plurality of divider walls partitioning the media chamber into media compartments. A top cover may be hingably attached to a portion of the lateral wall of the cartridge. The housing may be further comprised of a plurality of locating walls extending vertically upward from the bottom wall of the housing and between the divider walls of the cartridge. The locating walls extend transversely across the treatment chamber between opposed portions of the side wall of the housing. The divider walls may be formed with a hollow upward cavity, with the locating walls extending into the upward cavities of the divider walls. In some cases, the hollow upward cavities of the divider walls may have an upward V-shape, and the locating walls may have a corresponding upward V-shape and may be engaged with the V-shaped cavities of the divider walls. The V-shaped locating walls may engage in a liquid-impermeable seal with the V-shaped cavities of the divider walls. An upper edge of the central wall may be comprised of a plurality of upwardly extending teeth.

The apparatus may be further comprised of a pump operable to cause liquid flow into the treatment chamber, through the media chamber, and into the discharge chamber. The pump may be disposed in the discharge chamber.

Each of the foregoing aspects of the apparatus may be employed individually or in conjunction.

BRIEF DESCRIPTION OF THE DRAWINGS

The present disclosure will be provided with reference to the following drawings, in which like numerals refer to like elements, and in which.

Figure 1:
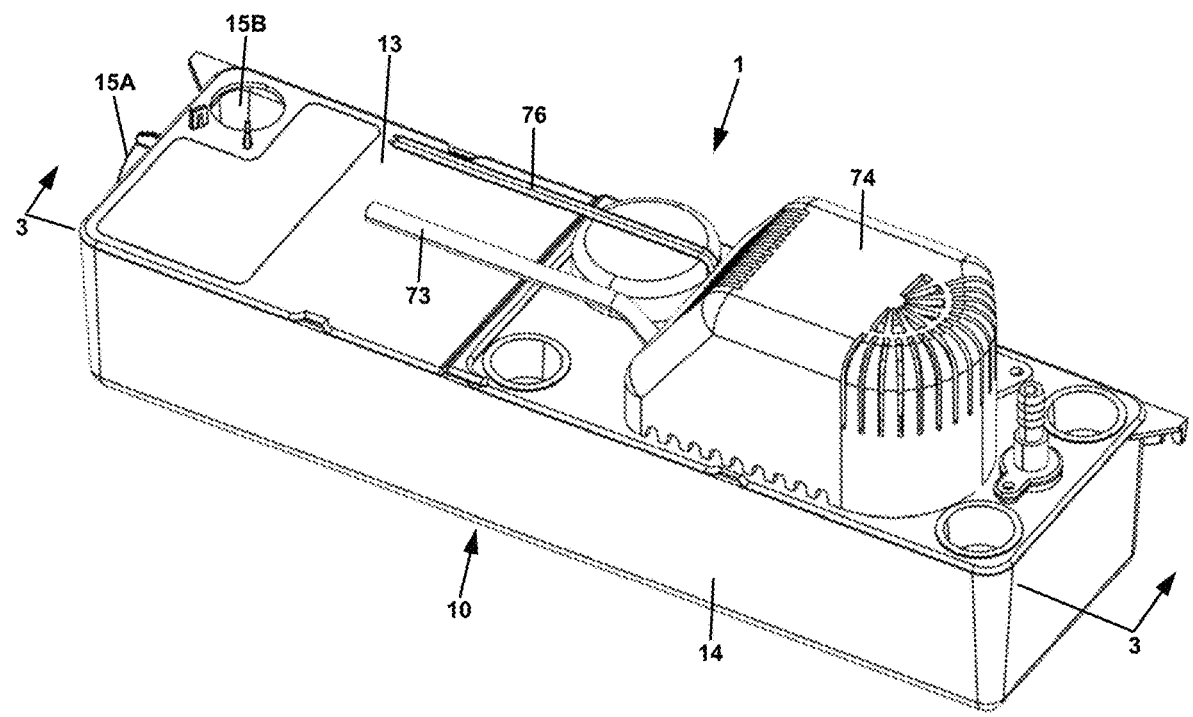
FIG. 1 is a first upper perspective view of the liquid processing apparatus of the present disclosure.
Figure 2:
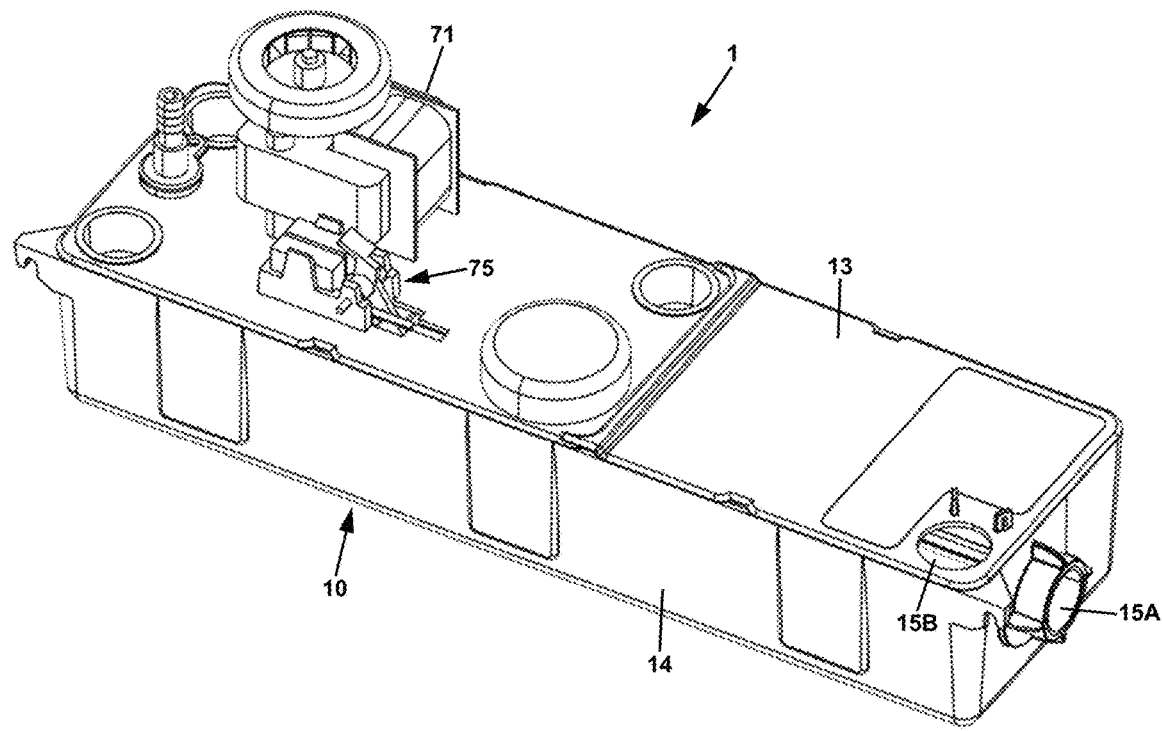
FIG. 2 is a second upper perspective view of the liquid processing apparatus shown with a protective cover removed.
Figure 3:
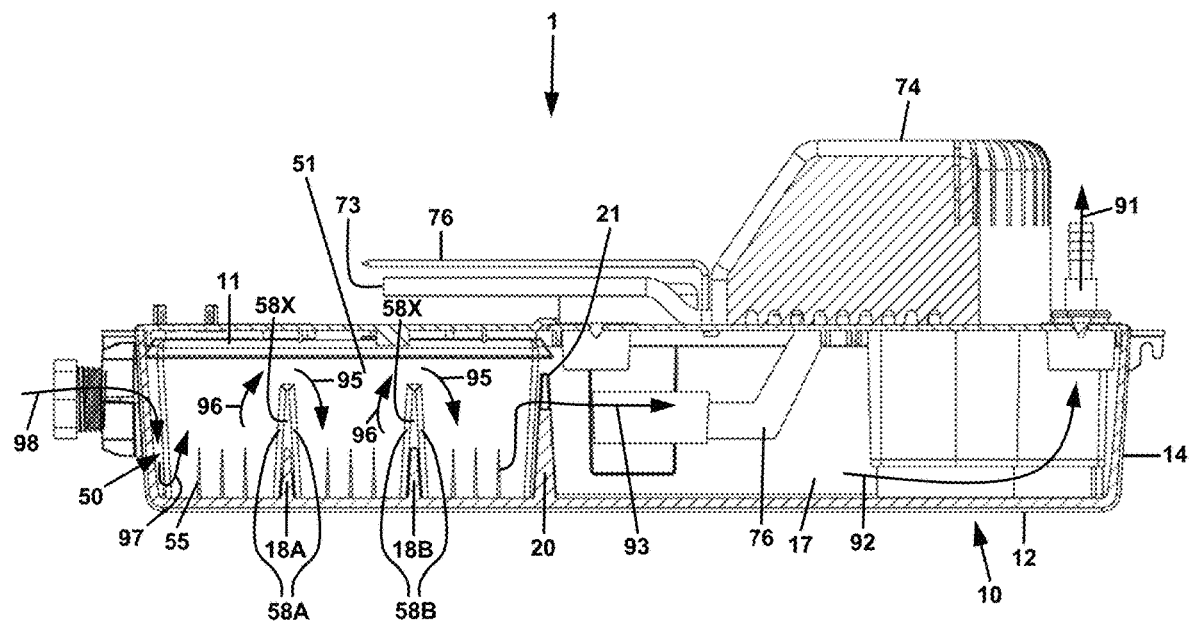
FIG. 3 is a side cross sectional view of the liquid processing apparatus taken along line 3-3 of FIG. 1.
Figure 4:
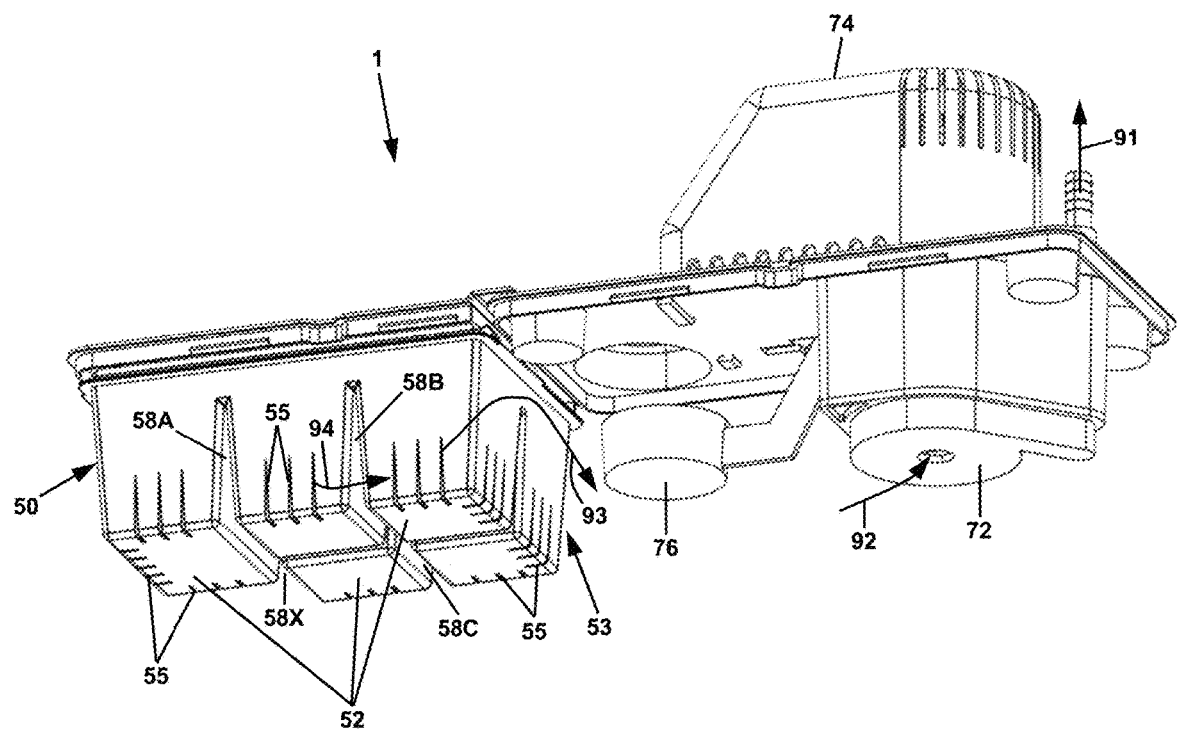
FIG. 4 is a lower perspective view of the apparatus with a liquid housing removed from the bottom thereof.
Figure 5:
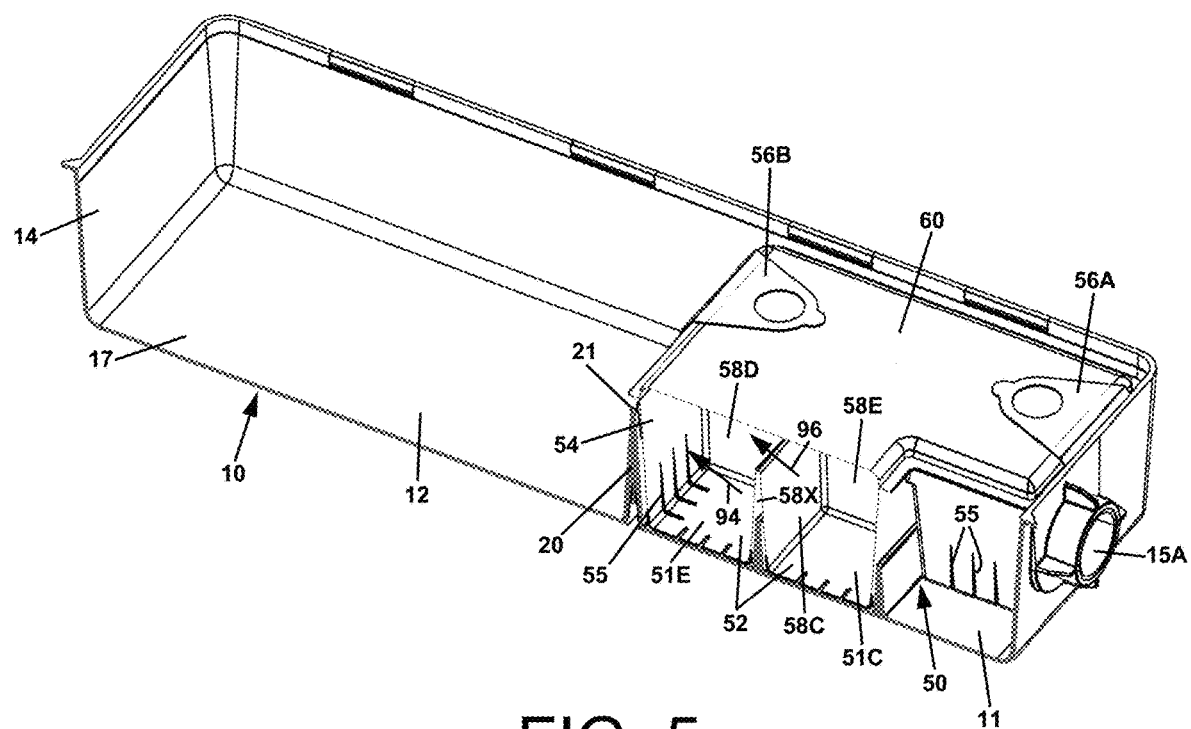
FIG. 5 is a cutaway perspective view of a liquid housing and a cartridge of the apparatus.

The present invention will be described in connection with certain preferred embodiments. However, it is to be understood that there is no intent to limit the invention to the embodiments described. On the contrary, the intent is to cover all alternatives, modifications, and equivalents as may be included within the spirit and scope of the invention as defined by the appended claims.

DETAILED DESCRIPTION

For a general understanding of the present disclosure, reference is made to the drawings. In the drawings, like reference numerals have been used throughout to designate identical elements. The drawings are to be considered exemplary, and are for purposes of illustration only. The dimensions, positions, order and relative sizes reflected in the drawings attached hereto may vary.

In the following disclosure, the liquid processing apparatus is described in the context of its use as an apparatus for neutralizing a stream of water discharged from a liquid source, which may be a boiler or other energy conversion device. However, it is not to be construed as being limited only to use in neutralizing streams of water. The invention is adaptable to any use in which it is desirable to pass a stream of liquid through a medium to cause a chemical reaction, a neutralization, an ion exchange, or other chemical effect with one or more substances contained in the liquid.

It is also to be understood that any connection references used herein (e.g., attached, coupled, connected, and joined) are to be construed broadly and may include intermediate members between a collection of elements and relative movement between elements unless otherwise indicated. As such, connection references do not necessarily imply that two elements are directly connected and in fixed relation to each other.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the present disclosure.

The term "providing", such as for "providing a medium" and the like, when recited in the claims, is not intended to require any particular delivery or receipt of the provided item. Rather, the term "providing" is merely used to recite items that will be referred to in subsequent elements of the claim(s), for purposes of clarity and ease of readability.

The terms "about" and "substantially" are used herein with respect to measurable values and ranges due to expected variations known to those skilled in the art (e.g., limitations and variabilities in measurements).

In the operation of a high efficiency boiler in accordance with environmental regulations, an aqueous acidic condensate is produced. In order to comply with regulations, and to prevent any undesirable effect on downstream piping and other fluid handling equipment, it is desirable to neutralize the condensate, i.e., to adjust the pH to a range of between about 5 and 9, and more preferably to between about 6 and 8. A liquid processing apparatus in accordance with the present disclosure may be used for performing a neutralization of a condensate or other source of acidic liquid.

Such an apparatus 10 is shown as a complete assembly, or nearly complete assembly, in FIGS. 1-4. Various subassemblies of the apparatus 10 are shown in FIGS. 5-9B.

Referring first to FIGS. 1-4, the apparatus 1 is comprised of a housing 10 and a cartridge 50 containing a medium 80 for causing a chemical effect on a fluid flowing through the medium 80. The medium 80 may be a composition that causes neutralization of an acidic or basic aqueous solution flowing through it. The housing 10 may be comprised of a bottom wall 12, a side wall 14, and a central wall 20 having a first end 22 joined to the side wall 14 and a second end 24 joined to the side wall 14. The central wall 20 divides a volume enclosed by the bottom wall 12 and side wall 14 into a treatment chamber 11 and a discharge chamber 17.

The cartridge 50 may be comprised of a container 53 comprising a base wall 52 and a lateral wall 54 forming a media chamber 51, and a plurality of passageways 55 through at least one of the base wall 52 and side wall 54, rendering the media chamber 51 in communication with the treatment chamber 11.

A top cover 60 may be hingably attached to a portion of the lateral wall 54 of the container 53. The cover 60 and container 53 may be formed from plastic as a single piece and joined by a "living hinge" formed at their contiguous edges in a "clamshell" configuration. The cartridge 50 may be further comprised of a plurality of divider walls 58A-58E partitioning the media chamber 51 into media compartments 51A-51E. The housing 10 may be further comprised of a plurality of locating walls 18A-18B extending vertically upward from the bottom wall 12 of the housing 10 and between the divider walls 58A-58E of the cartridge 50. The locating walls 18A and 18B extend transversely across the treatment chamber between opposed portions of the side wall of the housing. The divider walls 58A-58E may be formed with hollow upward cavities 58X, with the locating walls 18A and 18B extending into the upward cavities 58X of the divider walls. In some cases, the hollow upward cavities 58X of the divider walls 58A-58E may have an upward V-shape, and the locating walls 18A and 18B may have a corresponding upward V-shape and may be engaged with the V-shaped cavities 58X of the divider walls 58A-58E. The V-shaped locating walls 18A and 18B may engage in a liquid-impermeable seal with the V-shaped cavities 58X of the divider walls 58A-58E. An upper edge 21 of the central wall 20 may be comprised of a plurality of upwardly extending teeth 23.

The apparatus 1 may be further comprised of a pump 70 operable to cause liquid flow into the treatment chamber 11, through the media chamber 51, and into the discharge chamber 17. The pump 70 may be comprised of a motor 71, electrical power supply wiring 73, and a volute 72 containing an impeller (not shown), which may be disposed in the discharge chamber 17. A level switch 75 may be provided, which is in electrical communication with the pump motor 71, and which controls on/off operation of the pump 70. The level switch 75 may be comprised of a float 76 that raises and lowers with liquid level in the discharge chamber 17, and electrical wires 78. A cover 74 may be provided which contains the pump motor 72 and prevents exposure of personnel to live electrical contacts and rotating elements of the pump motor 71.

Figure 6:
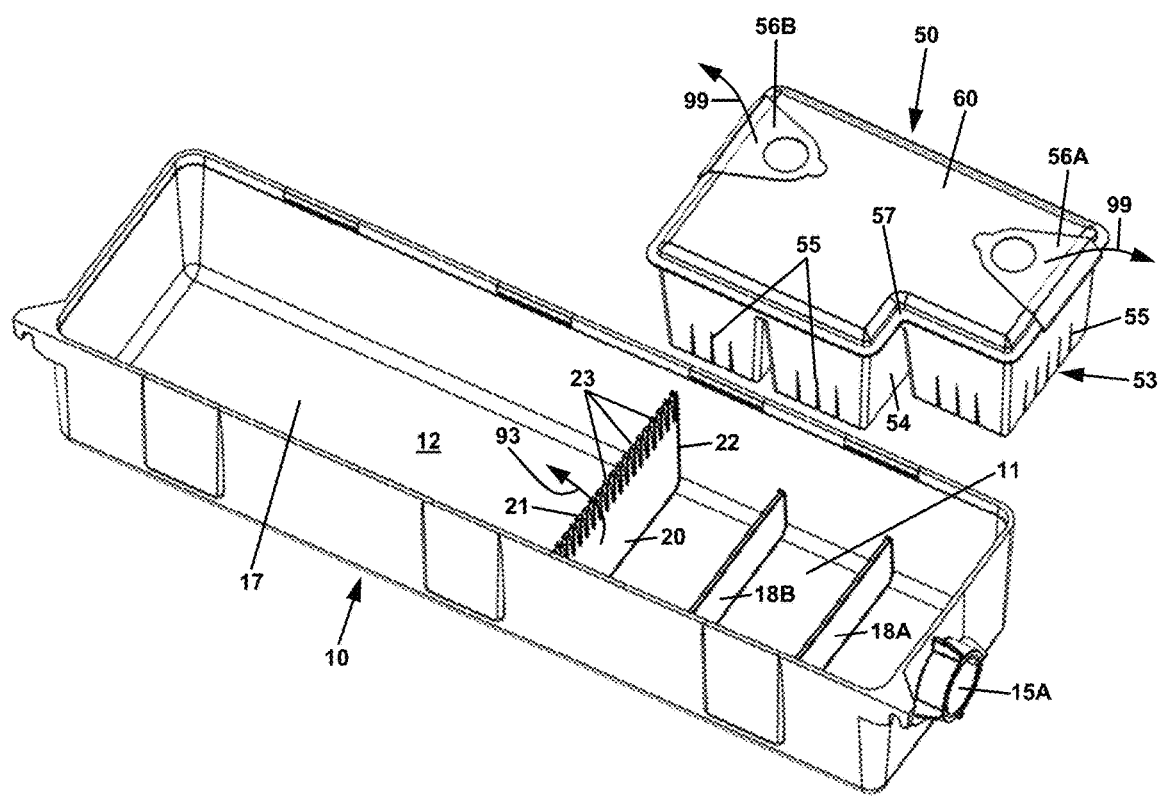
FIG. 6 is an exploded perspective view of the liquid housing and the cartridge of the apparatus.
Figure 7:
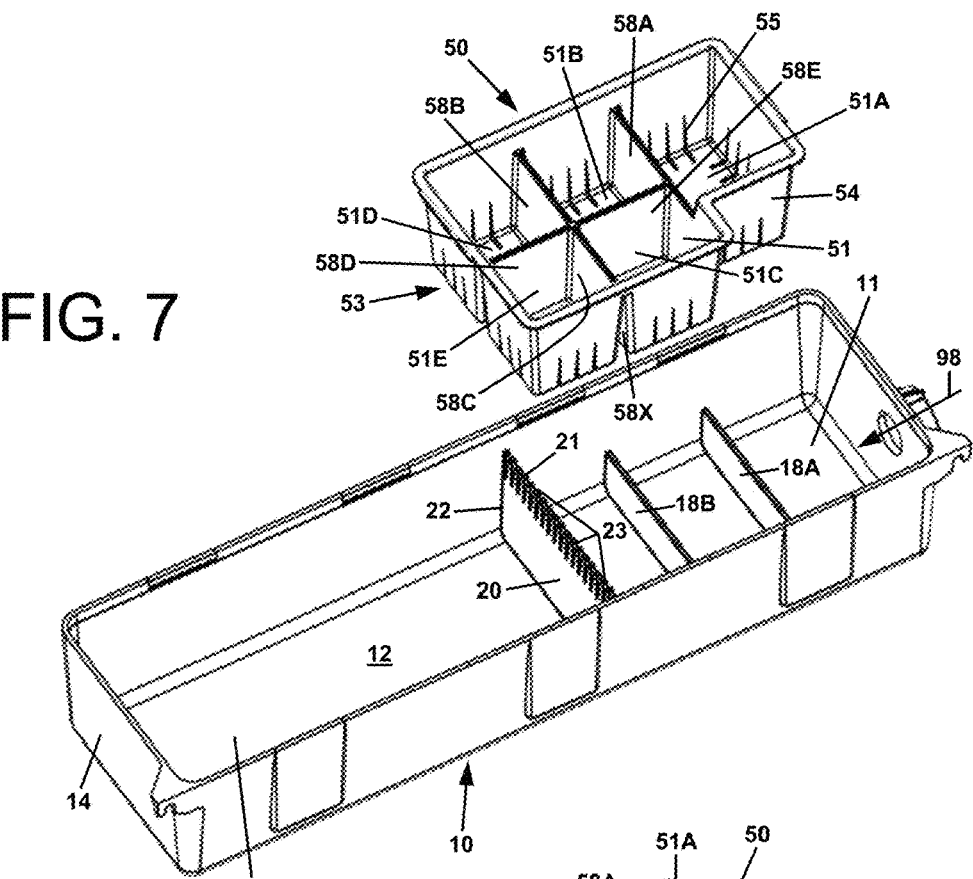
FIG. 7 is an exploded perspective view of the liquid housing and the cartridge of the apparatus shown with a cover of the cartridge removed.
Figure 8:
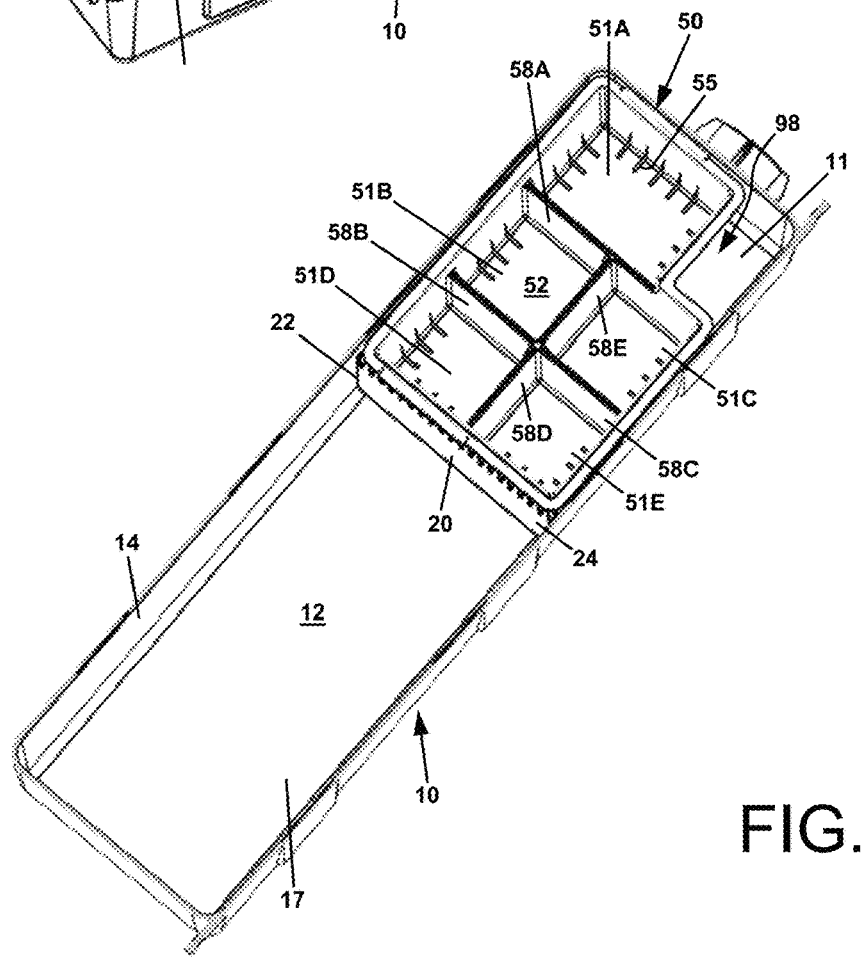
FIG. 8 is a perspective view of the assembled liquid housing and cartridge of the apparatus shown with a cover of the cartridge removed.
Figure 9A:
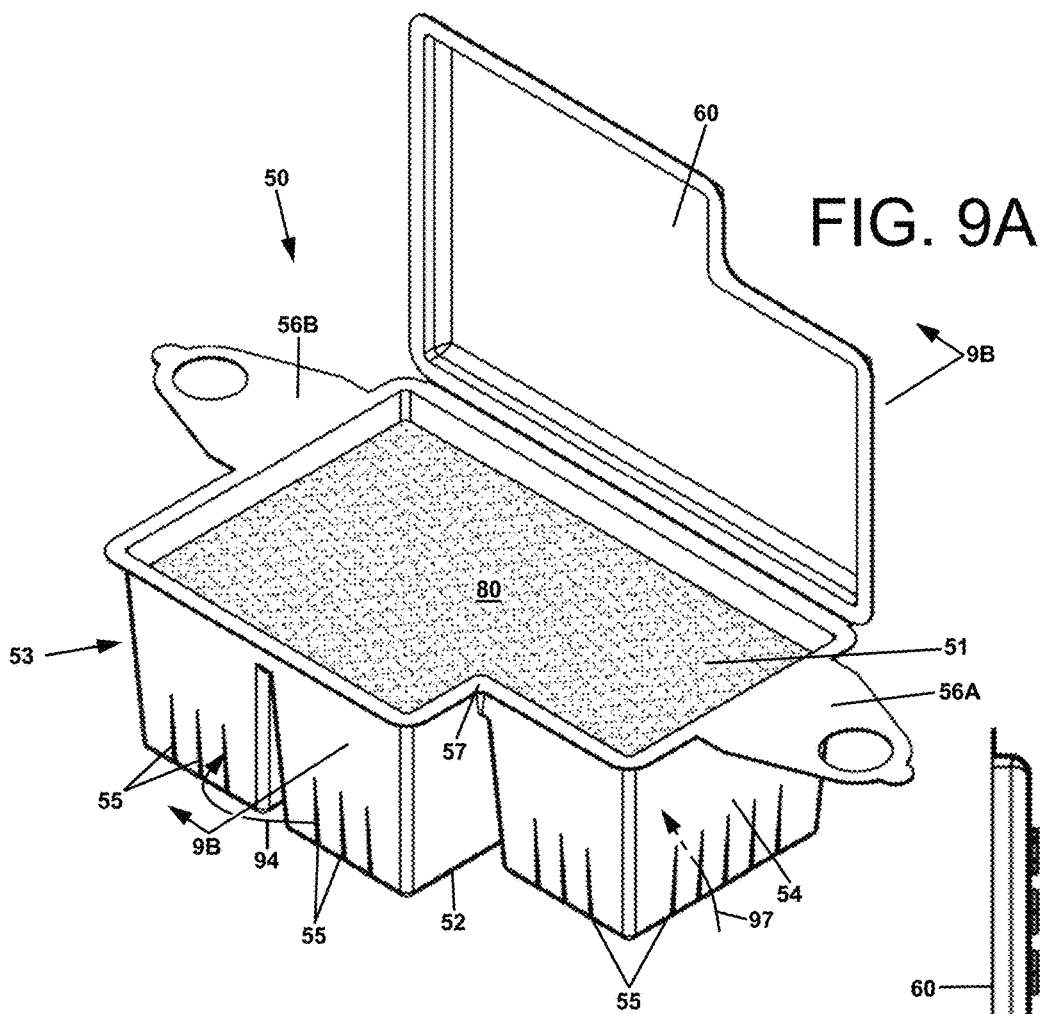
FIG. 9A is a perspective view of a neutralization cartridge of the apparatus shown with a hinged lid open and filled with a treatment medium.
Figure 9B:
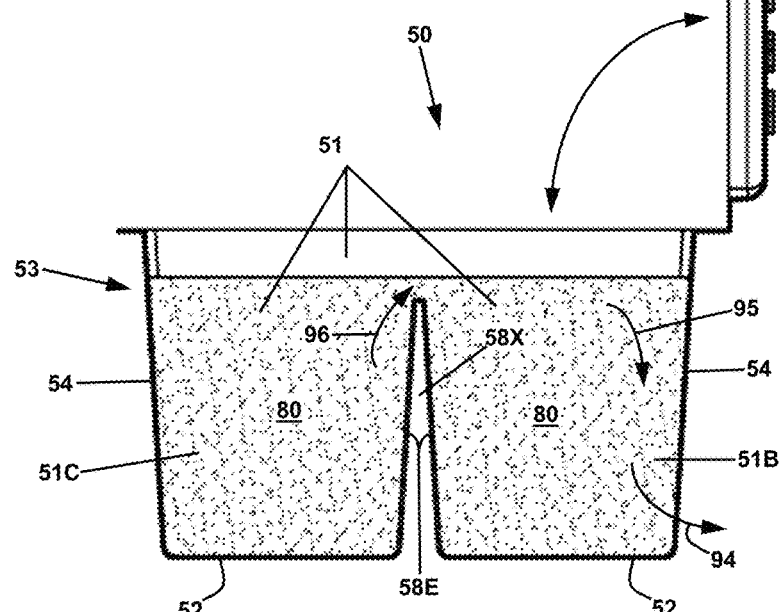
FIG. 9B is an end cross-sectional view of the cartridge of FIG. 9A taken along line 9B-9B of FIG. 9A.

Referring to FIGS. 9A and 9B, to prepare the cartridge 50 for use in treating a liquid, the container 53 of the cartridge 50 is filled with a treatment medium 80. For neutralization of an acidic liquid, the treatment medium 80 may be a basic salt or a basic oxide. In one case, the neutralization medium may be magnesium oxide. In some cases, the medium 80 may have a particle size range of between 2 and 10 millimeters. The particles may have pebble shapes, i.e. rounded spherical or ellipsoid shapes. Alternatively, the medium 80 may be ground into particles having irregular shapes. The choice of particle size enables an even liquid flow distribution throughout the medium 80 while providing a relative large surface area of the particles in the medium 80. The cover 60 of the cartridge 50 is then closed. The cartridge 50 may be provided with hingably attached tabs 56A and 56B, which may be pivoted upwardly and/or outwardly from a closed position as indicated by arrows 99 (FIG. 6).

A user (not shown) of the apparatus may engage his/her fingers with the tabs 56A and 56B, and use them to lower the cartridge 50 into the installed position shown in FIGS. 3-5 and FIG. 8. The tabs 56A and 56B may then be pivoted into the closed position shown in FIG. 5. With the cartridge 50 in the installed and operating position, a cartridge cover 13 may be fitted to the housing 10 on top of the cartridge 50. Additionally, the locating walls 18A-18B may be dimensioned and located in the treatment chamber 11 so as to precisely engage with the divider walls 58A-58E of the cartridge 50, thereby locating the cartridge 50 in a precise position in the treatment chamber 11, and holding the cartridge 50 in position during use. The locating walls 18A-18B and divider walls 58A-58E may act as baffles when liquid flow through the cartridge 50 occurs.

The liquid to be treated may be provided through one or both of inlet ports 15A and 15B. A recess 57 may be provided in the container 53 so that inlet flow into the treatment chamber 11 is not restricted. In operation of the apparatus 10, the pump 70 draws the fluid to be treated into the treatment chamber 11 through inlet ports 15A and 15B as indicated by arrows 98. Flow then proceeds inwardly though some of the passageways 55 into the treatment medium 80 as indicated by arrows 97. Flow may then occur upwardly though the medium 80 as indicated by arrows 96, over at least some of the divider walls 58A-58E, and then downwardly through the medium 80 as indicated by arrows 95. Flow through the medium 80 exits the media compartments through the passageways 55 as indicated by arrows 94 and then proceeds into a subsequent media chamber or over the central wall 20 into the discharge chamber 17 as indicated by arrows 93. The teeth 23 at the top of the central wall 20 may provide a regulating effect, causing a uniform distribution of flow along the upper edge 21 of the central wall 20. Liquid is then drawn into the volute 72 of the pump 70 as indicated by arrows 92, and is discharged as indicated by arrows 91. The level switch 75 may be used to operate the pump 70 intermittently, turning the pump 70 on when the liquid level in the discharge chamber 17 raises the float 76, and turning the pump off when the liquid level in the discharge chamber 17 lowers the float 76.

In summary, the combination of the passageways 55 into the media compartments 51A-51E, the divider walls 58A-58E that partition the media chamber 51 into media compartments 51A-51E engaged with the locating walls 18A-18B, and the central wall 20 may coact to function as a "motionless mixer" within the apparatus 10. The divider walls 58A-58E and locating walls 18A-18B may act as flow baffles. Thus, an element of fluid flowing through the treatment chamber 11 follows a tortuous path, and has a sufficiently long residence time in the treatment medium 80 so as to be completely neutralized. Additionally, this mixing effect, and the related flow distribution through the treatment medium 80 ensures that the treatment capacity (e.g., neutralization capacity) of the entire treatment medium 80 is exhausted, and none is wasted before the treatment medium 80 needs to be replaced.

When the treatment medium 80 is exhausted and needs to be replaced, the cartridge cover 13 may be removed. The entire cartridge 80 may then be easily removed from the housing 10, and replaced with a cartridge 80 containing fresh medium 80. The cover 13 and the container 53 and cover 60 of the cartridge 50 may be made of clear plastic to enable observation of the treatment medium 80.

It is therefore apparent that there has been provided, in accordance with the present disclosure, an apparatus for neutralizing a stream of water discharged from a source. The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

We claim:

1. A liquid processing apparatus comprising:
  a) a housing comprised of:
    a bottom wall;
    a side wall;
    a central wall.
    a first end joined to the side wall and a second end joined to the side wall, and dividing a volume enclosed by the bottom wall and side wall into a treatment chamber and a discharge chamber; and
    a plurality of baffle walls extending vertically upward from the bottom wall of the housing and into the impermeable divider walls of the cartridge, and extending transversely across the treatment chamber between opposed portions of the side wall of the housing; and
  b) a cartridge disposed in the treatment chamber and comprised of a base wall and a lateral wall forming a media chamber, a plurality of impermeable divider walls extending vertically upward from the base wall and partitioning the media chamber into a plurality of separate media compartments, and a plurality of passageways through at least one of the base wall and the lateral wall rendering the media chamber in communication with the treatment chamber;
  wherein the impermeable divider walls are each formed with a hollow upward cavity, and wherein the baffle walls extend upwardly into the upward cavities of the divider walls;
  wherein the hollow upward cavities of the impermeable divider walls have an upward V-shape, and the baffle walls have a corresponding upward V-shape and are engaged with the V-shaped cavities of the impermeable divider walls; and
  wherein the V-shaped baffle walls engage in a liquid-impermeable seal with the V-shaped cavities of the impermeable divider walls.

2. The apparatus of claim 1, further comprising a treatment medium contained in the media chamber.

3. The apparatus of claim 1, further comprising a top cover hingably attached to a portion of the lateral wall of the cartridge.

4. The apparatus of claim 1, further comprising a pump operable to cause liquid flow into the treatment chamber, through the media chamber, and into the discharge chamber.

5. The apparatus of claim 1, wherein the upper edge of the central wall is comprised of a plurality of upwardly extending teeth.

6. The liquid processing apparatus of claim 1, wherein the impermeable divider walls include an upper edge located beneath an upper edge of the side wall of the housing.

7. A liquid processing apparatus comprising:
  a) a housing comprising a bottom wall, a side wall, and a central wall having a first end joined to the side wall and a second end joined to the side wall and dividing a volume enclosed by the bottom wall and side wall into a treatment chamber and a discharge chamber, and a baffle wall within the treatment chamber extending upwardly from the bottom wall.
  b) a cartridge disposed in the treatment chamber and comprised of a base wall and a lateral wall forming a media chamber, an impermeable divider wall partitioning the media chamber into separate media compartments and formed with a hollow upward cavity containing the baffle wall of the housing; and c) a plurality of passageways through at least one of the base wall and the lateral wall rendering the media chamber in communication with the treatment chamber;

wherein the hollow upward cavity of the impermeable divider wall has an upward V-shape, and the baffle wall has a corresponding upward V-shape and is engaged with the V-shaped cavity of the impermeable divider wall; and wherein the V-shaped baffle wall engages in a liquid-impermeable seal with the V-shaped cavity of the impermeable divider wall.

8. The apparatus of claim 1, further comprising a first tab hingably attached to a first portion of the lateral wall of the cartridge, and a second tab hingably attached to a second portion of the lateral wall of the cartridge.

9. The apparatus of claim 8, wherein the first portion of the lateral wall of the cartridge is opposite the second portion of the lateral wall of the cartridge.

10. The apparatus of claim 8, wherein the first and second tabs are pivotable from a horizontal position upwardly to a vertical position.

11. The liquid processing apparatus of claim 7, wherein the baffle wall extends transversely across the treatment chamber between opposed portions of the side wall of the housing.

12. The liquid processing apparatus of claim 7, wherein the housing is comprised of a plurality of baffle walls extending upwardly from the bottom wall thereof, and the cartridge is comprised of a plurality of impermeable divider walls partitioning the media chamber into the separate media compartments, each impermeable divider wall formed with a hollow upward cavity containing one of the baffle walls.

13. The liquid processing apparatus of claim , 7, wherein a first portion of the media compartments are in communication with a second portion of the media compartments.

14. The liquid processing apparatus of claim 7, wherein the impermeable divider wall includes an upper edge located beneath an upper edge of the side wall of the housing.

15. A liquid processing apparatus comprising:

a) a housing comprising a bottom wall, a side wall, and a central wall, a first end joined to the side wall and a second end joined to the side wall, and dividing a volume enclosed by the bottom wall and side wall into a treatment chamber and a discharge chamber; and b) a cartridge disposed in the treatment chamber and comprised of a base wall and a lateral wall forming a media chamber, a plurality of impermeable divider walls extending vertically upward from the base wall and partitioning the media chamber into a plurality of separate media compartments, and a plurality of passageways through at least one of the base wall and the lateral wall rendering the media chamber in communication with the treatment chamber;

wherein the plurality of separate media compartments include a passageway through at least one of the base wall and the lateral wall rendering a first portion of the media compartments in communication with a second portion of the media compartments.

* * * * *